US006935293B2

(12) United States Patent
Bonde et al.

(10) Patent No.: US 6,935,293 B2
(45) Date of Patent: Aug. 30, 2005

(54) OIL CIRCUIT FOR TWIN CAM INTERNAL COMBUSTION ENGINE

(75) Inventors: Kevin G. Bonde, Kiel, WI (US); Terrence M. Rotter, Sheboygan Falls, WI (US); Robert W. Richards, Sheboygan, WI (US); David B. Reinbold, Kohler, WI (US); William D. Koenigs, Fond du Lac, WI (US); Reid L. Hanson, Manitowoc, WI (US)

(73) Assignee: Kohler Co., Kohler, WI (US)

( * ) Notice: Subject to any disclaimer, the term of this patent is extended or adjusted under 35 U.S.C. 154(b) by 11 days.

(21) Appl. No.: 10/644,538

(22) Filed: Aug. 20, 2003

(65) Prior Publication Data

US 2004/0123830 A1 Jul. 1, 2004

Related U.S. Application Data

(63) Continuation-in-part of application No. 10/188,131, filed on Jul. 1, 2002, now Pat. No. 6,732,701, and a continuation-in-part of application No. 10/198,787, filed on Jul. 18, 2002, now Pat. No. 6,684,846.

(51) Int. Cl.[7] .............................................. F01M 1/06
(52) U.S. Cl. .................................................. 123/90.33
(58) Field of Search ..................... 123/196 R, 90.33, 123/196 W; 184/6.18

(56) References Cited

U.S. PATENT DOCUMENTS

| 4,622,933 | A | * | 11/1986 | Fukuo et al. | ........... 123/196 R |
| 4,901,819 | A | * | 2/1990 | Tamba et al. | ............. 184/6.18 |
| 5,887,678 | A | * | 3/1999 | Lavender | .................... 184/11.2 |
| 6,422,194 | B2 | * | 7/2002 | Ito et al. | ................. 123/196 R |

* cited by examiner

*Primary Examiner*—Henry C. Yuen
*Assistant Examiner*—Hyder Ali
(74) *Attorney, Agent, or Firm*—Quarles & Brady LLP

(57) ABSTRACT

An engine having an oil circuit and method of communicating oil within an engine are disclosed. The engine includes a crankcase, a pump, and a camshaft having a first channel extending between first and second ends of the camshaft, where lubricant is provided from the pump to the first channel at the first end and communicated by way of the first channel to the second end. The engine also includes a crankshaft, a second channel communicating at least some of the lubricant delivered to the second end of the first camshaft to a crankshaft bearing, and a third channel within the crankshaft that receives at least some of the lubricant communicated by the second channel and communicates at least some of the lubricant to a crankpin bearing on the crankshaft. In some embodiments, lubricant is communicated by the third channel to an eccentric bearing configured to support a balance weight.

20 Claims, 13 Drawing Sheets

OIL CIRCUIT FOR TWIN CAM INTERNAL COMBUSTION ENGINE

CROSS-REFERENCE TO RELATED APPLICATIONS

This application is a continuation-in-part of U.S. patent application Ser. No. 10/188,131, filed on Jul. 1, 2002 now U.S. Pat. No. 6,732,701, and also of U.S. patent application Ser. No. 10/198,787, filed on Jul. 18, 2002 now U.S. Pat. No. 6,684,846.

FIELD OF THE INVENTION

The present invention relates to internal combustion engines, particularly single cylinder internal combustion engines such as those used to power lawnmowers, sump pumps, portable generators and other devices. More specifically, the present invention relates to a twin cam design and related oil circuit for implementation in such engines.

BACKGROUND OF THE INVENTION

Single cylinder internal combustion engines typically employ an intake valve and an exhaust valve for allowing fuel and air to enter the engine cylinder and allowing exhaust to exit the cylinder, respectively. These valves often are actuated by way of valve trains that impart linear movement to the valves in response to rotational movement of cams. In many such engines, the intake and exhaust valves are actuated in one direction (to close) by respective springs and actuated in the opposite direction (to open) by respective rocker arms. The rocker arms in turn are actuated by respective push rods that ride along respective cams that are supported by and rotate about a camshaft, which in turn is driven by a crankshaft of the engine. A fan also driven by the crankshaft blows air across the cylinder to cool the cylinder.

In such engines, it is important that oil or other lubrication be provided to at least the main bearings for the crankshaft and the camshaft, and that such oil be filtered. Consequently, most single cylinder engines also have carefully-designed lubrication systems to provide the necessary lubrication. The lubrication systems typically include an oil reservoir, a pump, and an oil circuit consisting of a series of passages by which oil is directed from the pump to the oil filter and to the components requiring lubrication. The oil passages are commonly manufactured by drilling or casting tubes into the crankcase and cover/oil pan of the engine.

Single cylinder engines of this design have several limitations. To begin with, the push rods that are positioned on such engines in between the camshaft and the rocker arms are positioned close together on a single side of the cylinder. Likewise, the pair of rocker arms at the cylinder head are positioned close together along a single side of the cylinder head, as are the pair of valves. Consequently, the valve bridge area of the cylinder head in between the valves, which is the hottest area of the cylinder head, is narrow and partially shielded from air being blown across the cylinder head by the fan. As a result, the valve bridge area may not be cooled as well as might be desirable, which can eventually cause weakening or breakage of the cylinder head, or to distortion/movement of the valve seats adjacent to this valve bridge area.

Additionally, the oil circuits in such single cylinder engines are often complicated in design and expensive to manufacture. In particular, the drilling or casting that is required in order to provide the required oil passages within the crankcase walls and cover/oil pan can be expensive and difficult to manufacture. The casting of tubular passages in particular is expensive insofar as it requires the use of cores or casting metal tubes within the engine material (e.g., aluminum). These drilling or casting (involving cores or metal tubes) procedures add to the complexity and costs of manufacturing the engine.

Further, given their complexity and large number of moving parts, the valve trains (including the camshaft and crankshaft) of such engines also can be difficult and costly to design and manufacture. For example, the two cams on a camshaft of such an engine typically must be oriented differently so that their respective main cam lobes are 100 or more degrees apart. Consequently, the manufacture of a camshaft with two such differently-oriented cams can be difficult and expensive, particularly when it is desired to integrally form the camshaft and cams as a single part. The costs of manufacturing of such valve train components can be further exacerbated if it is desired to manufacture such components from materials that are more durable or that provide quieter operation, since it is typically more difficult to mold or machine complex parts from such materials.

It would therefore be advantageous if a new single cylinder engine was designed that avoided or suffered less from the above problems. In particular, it would be advantageous if a single cylinder engine with robust, quietly-operating components could be designed that was more easily and cost-effectively manufactured than conventional engines, particularly in terms of the costs associated with the components of its valve train and lubrication system. Further, it would be advantageous if a single cylinder engine could be designed in which there was more effective cooling of the valve bridge area than in conventional engines.

SUMMARY OF THE INVENTION

The present inventors have discovered a new, twin-cam single cylinder engine design having two camshafts that are each driven by the crankshaft. Because two camshafts are employed, one of which drives a valve train for an intake valve and one of which drives a valve train for an exhaust valve, the valves are respectively positioned on opposite sides of the cylinder so that the valve bridge area is exposed to allow for more effective cooling of that area. Each of the twin camshafts includes a respective internal passage extending the length of the respective camshaft. One of the camshafts is supported by an oil pump. Rotation of that camshaft drives the pump, causing oil to be pumped up through the internal passage in that camshaft and also (in some embodiments) toward a lower bearing of the crankshaft.

The oil pumped up through the internal passage in the camshaft is then directed through molded passages within a top of the crankcase, first to an oil filter, and then from the oil filter to an upper bearing of the crankshaft as well as to the other camshaft. Oil provided to the crankshaft, either by way of the upper bearing and the lower bearing or simply by way of the upper bearing, is further communicated through passages within the crankshaft to the crankpin bearing as well as to eccentric bearings that support a balance weight. The oil flowing through the internal passage within the top of the crankcase to the other camshaft further flows through that camshaft to the lower bearing of that camshaft.

The passages within the top of the crankcase are formed by molding grooves in the top and covering those grooves with an additional plate. Because twin camshafts are employed, each of which has only a single cam lobe, the camshafts can more easily be manufactured from robust, quietly-operating materials. Additionally, by employing the passages within the top of the crankcase and within the camshafts, manufacture of the oil circuit is simpler and more cost-effective than in conventional engine designs. In particular, the number and complexity of drilled passages within the crankcase are reduced in comparison with comparable conventional engines. Thus, an engine can be constructed with comparatively less effort and expense that provides pressurized oil to a variety of components within the engine including, for example, crankpin and eccentric bearings along a crankshaft of the engine.

In particular, the present invention relates to an internal combustion engine that includes a crankcase, a pump supported by the crankcase, where the pump has an inlet and a first outlet, and a first camshaft having a first channel extending between first and second ends of the first camshaft, where the first camshaft end is supported at least indirectly by one of the pump and the crankcase, and where lubricant is provided from the pump to the first channel at the first end and communicated by way of the first channel to the second end. The internal combustion engine further includes a crankshaft supported by the crankcase, a second channel communicating at least a first portion of the lubricant delivered to the second end of the first camshaft by way of the first channel to a first crankshaft bearing of the crankshaft, and a third channel within the crankshaft that receives at least a second portion of the lubricant communicated by the second channel and further communicates at least a third portion of the second portion of the lubricant to a crankpin bearing on the crankshaft.

The present invention additionally relates to a system that includes a pump capable of supplying lubricant, a first passage at least partially linking the pump to a crankshaft bearing so that at least a first portion of the lubricant supplied by the pump is communicated to the crankshaft bearing, and a crankshaft supported with respect to the crankshaft bearing. The crankshaft further includes a first eccentric bearing, where the first eccentric bearing is configured to support at least one balance weight component, and a second passage within the crankshaft, where the second passage is provided with at least a second portion of the lubricant by way of the crankshaft bearing and communicates at least a third portion of the lubricant to a first outer surface of the first eccentric bearing.

The present invention additionally relates to a single-cylinder internal combustion engine that includes a cylinder, a crankcase, a first camshaft supported at least indirectly by the crankcase, and a second camshaft supported at least indirectly by the crankcase, where the first camshaft includes a first cam and the second camshaft includes a second cam. The engine also includes a crankshaft supported at least indirectly by the crankcase, where the crankshaft is at least indirectly coupled to each of the first and second camshafts so that rotation of the crankshaft causes rotation of each of the first and second camshafts and their respective cams, and where rotation of the respective cams is capable of producing corresponding movement of first and second valves associated with the cylinder, respectively. The engine additionally includes means for communicating lubricant to at least one bearing associated with the crankshaft.

The present invention further relates to a method of communicating lubricant within an internal combustion engine. The method includes communicating at least a first portion of the lubricant to a crankshaft bearing by way of at least one first channel, and further communicating at least a second portion of the lubricant from the crankshaft bearing through at least one second channel within the crankshaft to an eccentric bearing, where the eccentric bearing is configured for supporting at least a portion of a balance weight.

DETAILED DESCRIPTION OF THE PREFERRED EMBODIMENT

Figure 1:
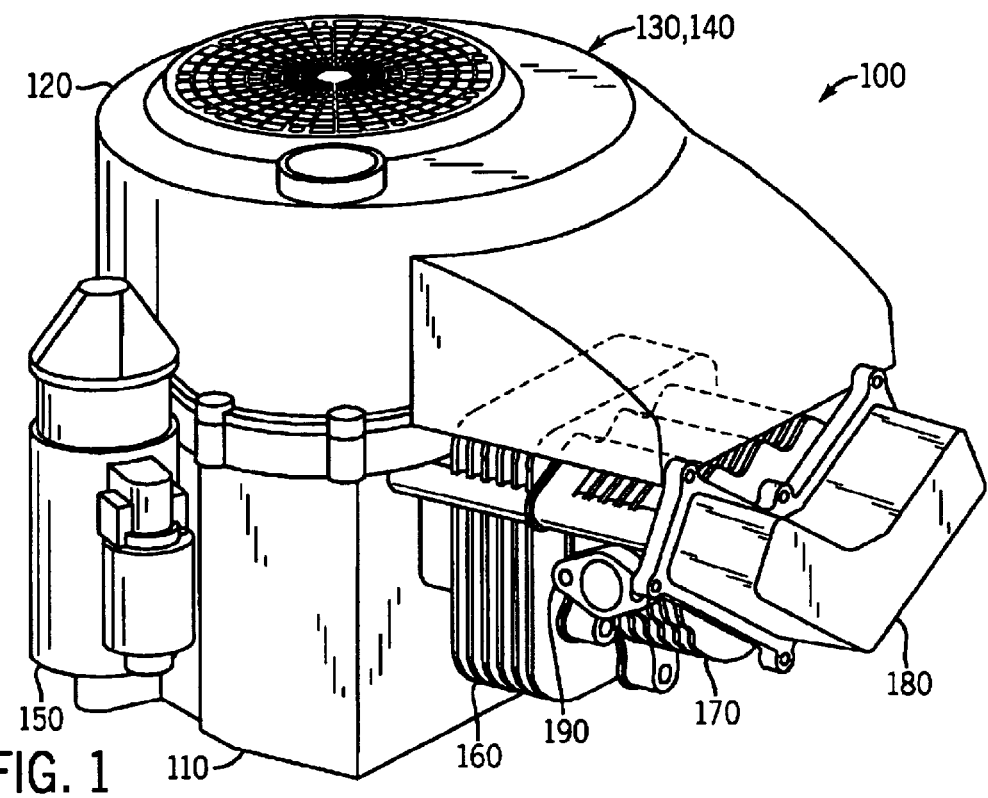
FIG. 1 is a first perspective view of a single cylinder engine, taken from a side of the engine on which are located a starter and cylinder head.
Figure 2:
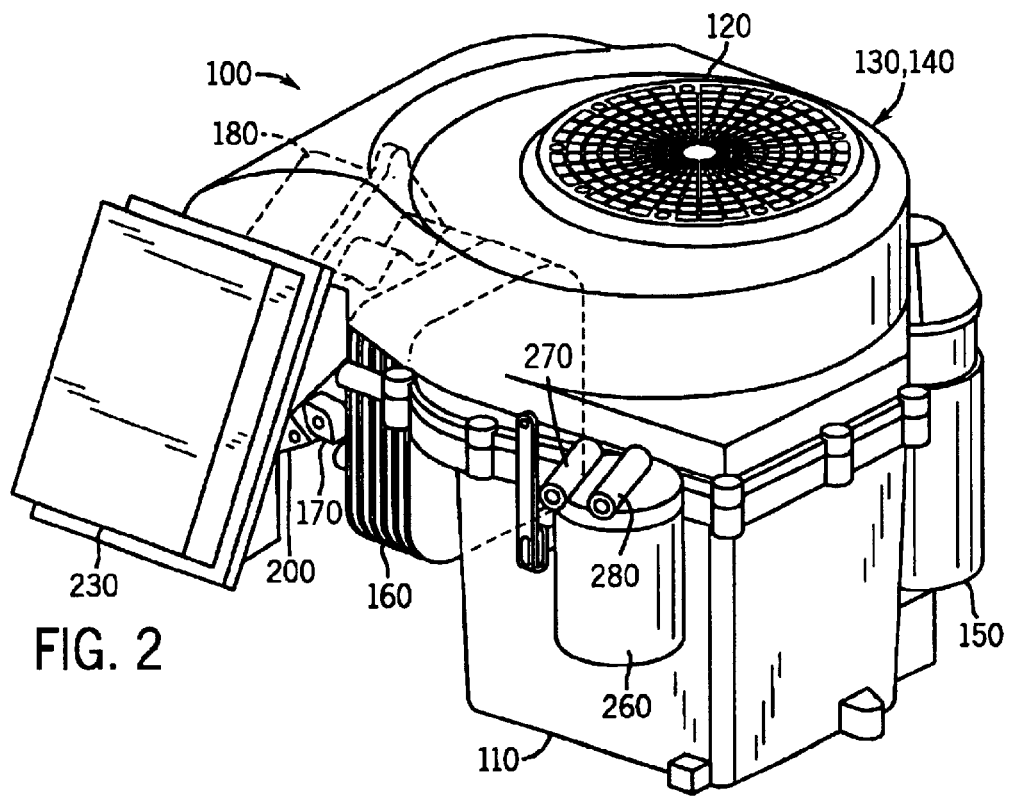
FIG. 2 is a second perspective view of the single cylinder engine of FIG. 1, taken from a side of the engine on which are located an air cleaner and oil filter.

Referring to FIGS. 1 and 2, a new single cylinder, 4-stroke, internal combustion engine 100 designed by Kohler Co. of Kohler, Wis. includes a crankcase 110 and a blower housing 120, inside of which are a fan 130 and a flywheel 140. The engine 100 further includes a starter 150, a cylinder 160, a cylinder head 170, and a rocker arm cover 180. Attached to the cylinder head 170 are an air exhaust port 190 shown in FIG. 1 and an air intake port 200 shown in FIG. 2. As is well known in the art, during operation of the engine 100, a piston 210 (see FIG. 7) moves back and forth within the cylinder 160 towards and away from the cylinder head 170. The movement of the piston 210 in turn causes rotation of a crankshaft 220 (see FIGS. 7 and 18), as well as rotation of the fan 130 and the flywheel 140, which are coupled to the crankshaft. The rotation of the fan 130 cools the engine, and the rotation of the flywheel 140, causes a relatively constant rotational momentum to be maintained.

Referring specifically to FIG. 2, the engine 100 further includes an air filter 230 coupled to the air intake port 200, which filters the air required by the engine prior to the providing of the air to the cylinder head 170. The air provided to the air intake port 200 is communicated into the cylinder 160 by way of the cylinder head 170, and exits the engine by flowing from the cylinder through the cylinder head and then out of the air exhaust port 190. The inflow and outflow of air into and out of the cylinder 160 by way of the cylinder head 170 is governed by an input valve 240 and an output valve 250, respectively (see FIG. 8). Also as shown in FIG. 2, the engine 100 includes an oil filter 260 through which the oil of the engine 100 is passed and filtered. Specifically, the oil filter 260 is coupled to the crankcase 110 by way of incoming and outgoing lines 270, 280, respectively, whereby pressurized oil is provided into the oil filter and then is returned from the oil filter to the crankcase.

Figure 3:
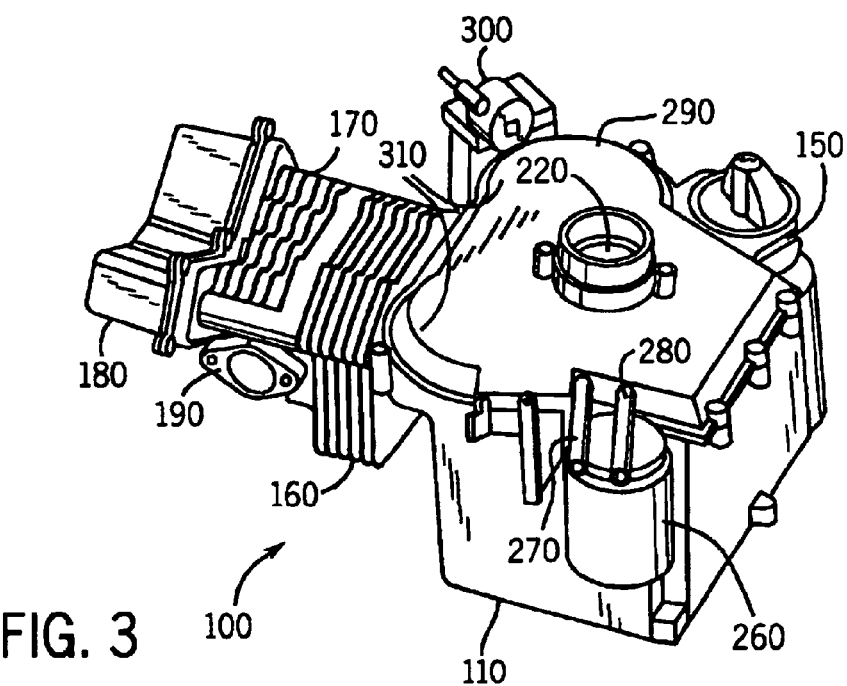
FIG. 3 is a third perspective view of the single cylinder engine of FIG. 1, in which certain parts of the engine have been removed to reveal additional internal parts of the engine.
Figure 4:
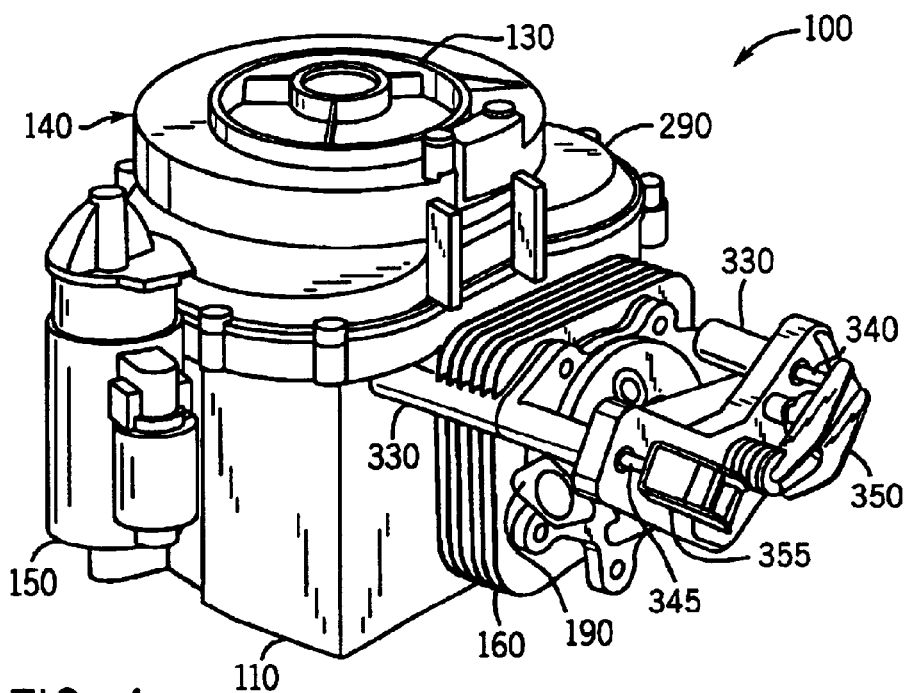
FIG. 4 is a fourth perspective view of the single cylinder engine of FIG. 1, in which certain parts of the engine have been removed to reveal additional internal parts of the engine.

Referring to FIGS. 3 and 4, the engine 100 is shown with the blower housing 120 removed to expose a top 290 of the crankcase 110. With respect to FIG. 3, in which both the fan 130 and the flywheel 140 are also removed, a coil 300 is shown that generates an electric current based upon rotation of the fan 130 and/or the flywheel 140, which together operate as a magneto. Additionally, the top 290 of the crankcase 110 is shown to have a pair of lobes 310 that cover a pair of spur-toothed gears 320, 325 (see FIGS. 5 and 7–8). With respect to FIG. 4, the fan 130 and the flywheel 140 are shown above the top 290 of the crankcase 110. Additionally, FIG. 4 shows the engine 100 without the rocker arm cover 180, to more clearly reveal a pair of tubes 330, 335 through which extend a pair of respective push rods 340,345. The push rods 340,345 extend between a pair of respective rocker arms 350,355 and a pair of cams 360, 365 (see FIG. 8) within the crankcase 110, as discussed further below.

Figure 5:
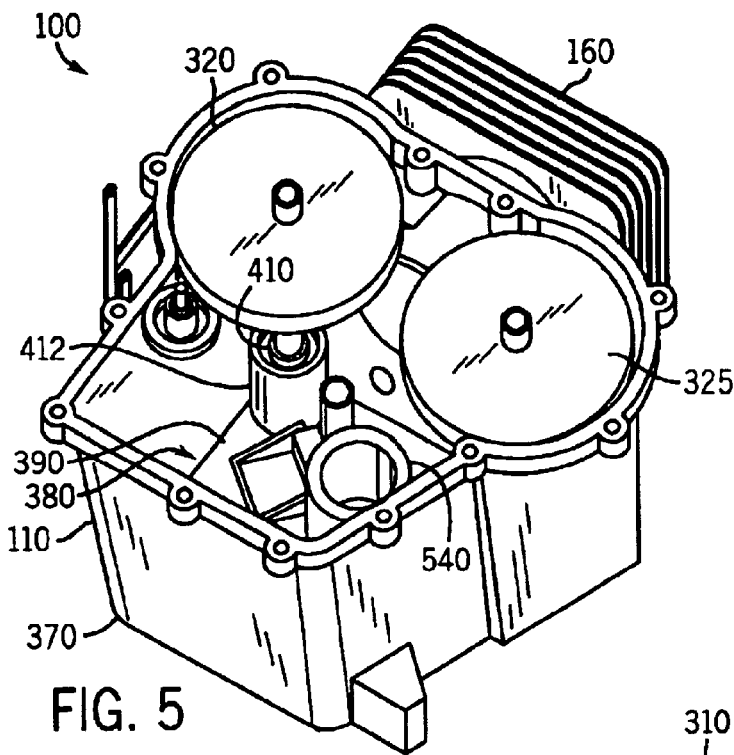
FIG. 5 is a fifth perspective view of the single cylinder engine of FIG. 1, in which a top of the crankcase has been removed to reveal an interior of the crankcase.
Figure 6:
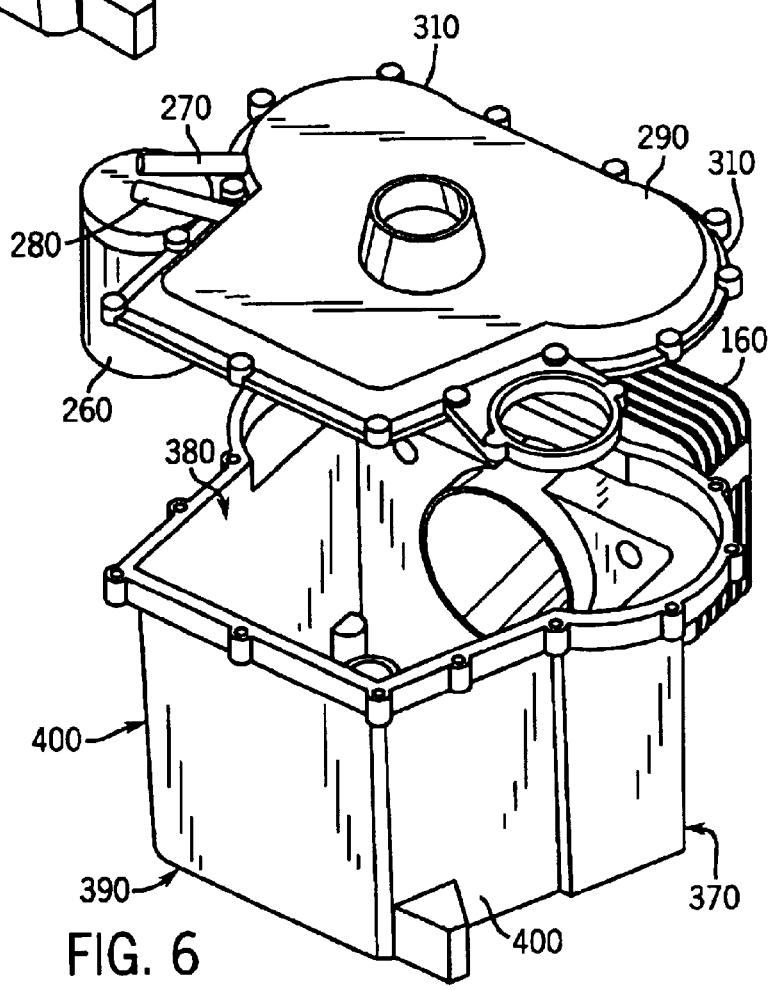
FIG. 6 is a sixth perspective view of the single cylinder engine of FIG. 1, in which the top of the crankcase is shown exploded from the bottom of the crankcase.

Turning to FIGS. 5 and 6, the engine 100 is shown with the top 290 of the crankcase 110 removed from a bottom 370 of the crankcase 110 to reveal an interior 380 of the crankcase. Additionally in FIGS. 5 and 6, the engine 100 is shown in cut-away to exclude portions of the engine that extend beyond the cylinder 160 such as the cylinder head 170. With respect to FIG. 6, the top 290 of the crankcase 110 is shown above the bottom 370 of the crankcase in an exploded view. In this embodiment, the bottom 370 includes not only a floor 390 of the crankcase, but also all four side walls 400 of the crankcase, while the top 290 only acts as the roof of the crankcase. The top 290 and bottom 370 are manufactured as two separate pieces such that, in order to open the crankcase 110, one physically removes the top from the bottom. Also, as shown in FIG. 5, the pair of gears 320, 325 within the crankcase 110 form part of respective camshafts 410,415 (see also FIG. 8) which in turn are supported by the bottom 370 of the crankcase 110. As discussed further with respect to FIGS. 9–12, the camshaft 410 in particular is supported by a pump 412, which in turn is supported by the bottom 370 of the crankcase 110. Because of its location along the bottom 370 of the crankcase 110, which acts as an oil reservoir, the pump 412 receives oil collected within the bottom 370 of the crankcase 110. The pump 412 further is actuated due to the rotation of the camshaft 410. A lower crankshaft bearing 540 for supporting the crankshaft 220 is additionally shown in FIG. 5 along the floor 390.

Figures 7, 8:
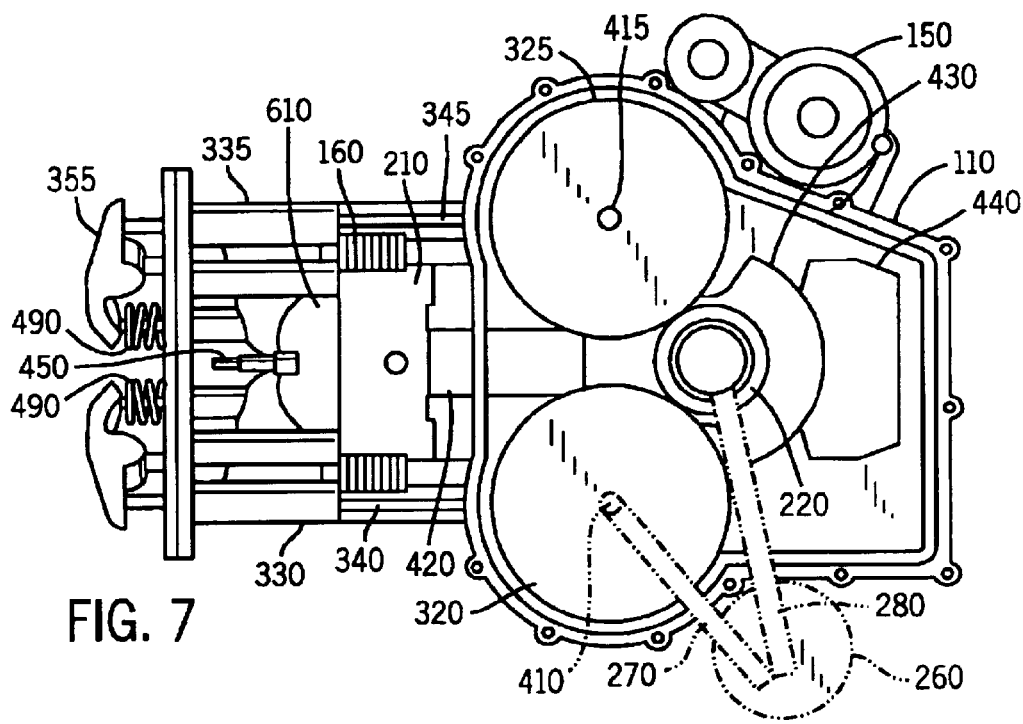
FIG. 7 is a top view of the single cylinder engine of FIG. 1, showing internal components of the engine.
FIG. 8 is a perspective view of components of a valve train of the single cylinder engine of FIG. 1.

Referring to FIG. 7, a top view of the engine 100 is provided in which additional internal components of the engine are shown. In particular, FIG. 7 shows the piston 210 within the cylinder 160 to be coupled to the crankshaft 220 by a connecting rod 420. The crankshaft 220 is in turn coupled to a rotating counterweight 430 and counterbalances 440, which balance some of the forces exerted upon the crankshaft 220 by the piston 210. A gear on the crankshaft 220 further is in contact with each of the gears 320,325, and thus the crankshaft communicates rotational motion to the camshafts 410,415. FIG. 7 further shows a spark plug 450 located on the cylinder head 170, which provides sparks during power strokes of the engine to cause combustion to occur within the cylinder 160. The electrical energy for the spark plug 450 is provided by the coil 300 (see FIG. 3).

Further referring to FIG. 7, and additionally to FIG. 8, elements of two valve trains 460,461 of the engine 100 are shown. The valve trains 460,461 respectively include the respective camshafts 410,415 which include the respective gears 320,325 and also include respective single-lobe cams 360,365 underneath the gears, respectively. Because each of the camshafts 410,415 includes only a single cam with a single lobe, the camshafts (in contrast to camshafts having multiple cams) can be easily molded or otherwise machined from single pieces of robust plastics or other materials. The use of such robust materials allows for quieter interaction of the cams 360,365 with respect to the respective push rods 340,345, and thus quieter operation of the engine 100 overall. In one embodiment, the cams 360,365 are integrally molded onto the respective backsides of the respective gears 320,325, and the camshafts 410,415 are identical to allow for even easier mass-production of the camshafts.

Additionally, respective cam follower arms 470,475 that are rotatably mounted to the crankcase 110 extend to rest upon the respective cams 360,365. The respective push rods 340,345 in turn rest upon the respective cam follower arms 470,475. As the cams 360,365 rotate, the push rods 340,345 are temporarily forced outward away from the crankcase 110 by the cam follower arms 470,475, which slidingly interface the rotating cams. This causes the rocker arms 350,355 to rock or rotate, and consequently causes the respective valves 240 and 250 to open toward the crankcase 110. As the cams 360,365 continue to rotate, however, the push rods 340,345 are allowed by the cam follower arms 470,475 to return inward to their original positions.

A pair of springs 480,490 positioned between the cylinder head 170 and the rocker arms 350,355 provide force tending to rock the rocker arms in directions tending to close the valves 240,250, respectively. Further as a result of this forcing action of the springs 480,490 upon the rocker arms 350,355, the push rods 340,345 are forced back to their original positions. The valve trains 460,461 are designed to have appropriate rocker ratios and masses to control contact stress levels with respect to the cams 360,365. FIG. 7 additionally shows that the components of the respective valve trains 460,461 are positioned on opposite sides of the cylinder 160 and cylinder head 170, thus exposing a valve bridge area 610.

In the present embodiment, the engine 100 is a vertical shaft engine capable of outputting 15–20 horsepower for implementation in a variety of consumer lawn and garden machinery such as lawn mowers. In alternate embodiments, the engine 100 can also be implemented as a horizontal shaft engine, be designed to output greater or lesser amounts of power, and/or be implemented in a variety of other types of machines, e.g., snow-blowers. Further, in alternate embodiments, the particular arrangement of parts within the engine 100 can vary from those shown and discussed above. For example, in one alternate embodiment, the cams 360, 365 could be located above the gears 320,325 rather than underneath the gears.

Referring still to FIG. 8, the camshafts 410,415 have respective internal channels 500,505, through which oil or other lubricant can be communicated. The internal channel 500 in particular communicates oil upward from the pump 412 to the gear 320, while the internal channel 505 communicates oil downward from the gear 325 to the base of the camshaft 415, where that camshaft rests upon the floor 390 of the crankcase 110. As discussed more fully with reference to FIG. 16, the internal channels 500,505 form a portion of an overall oil circuit of the engine 100.

Figure 9:
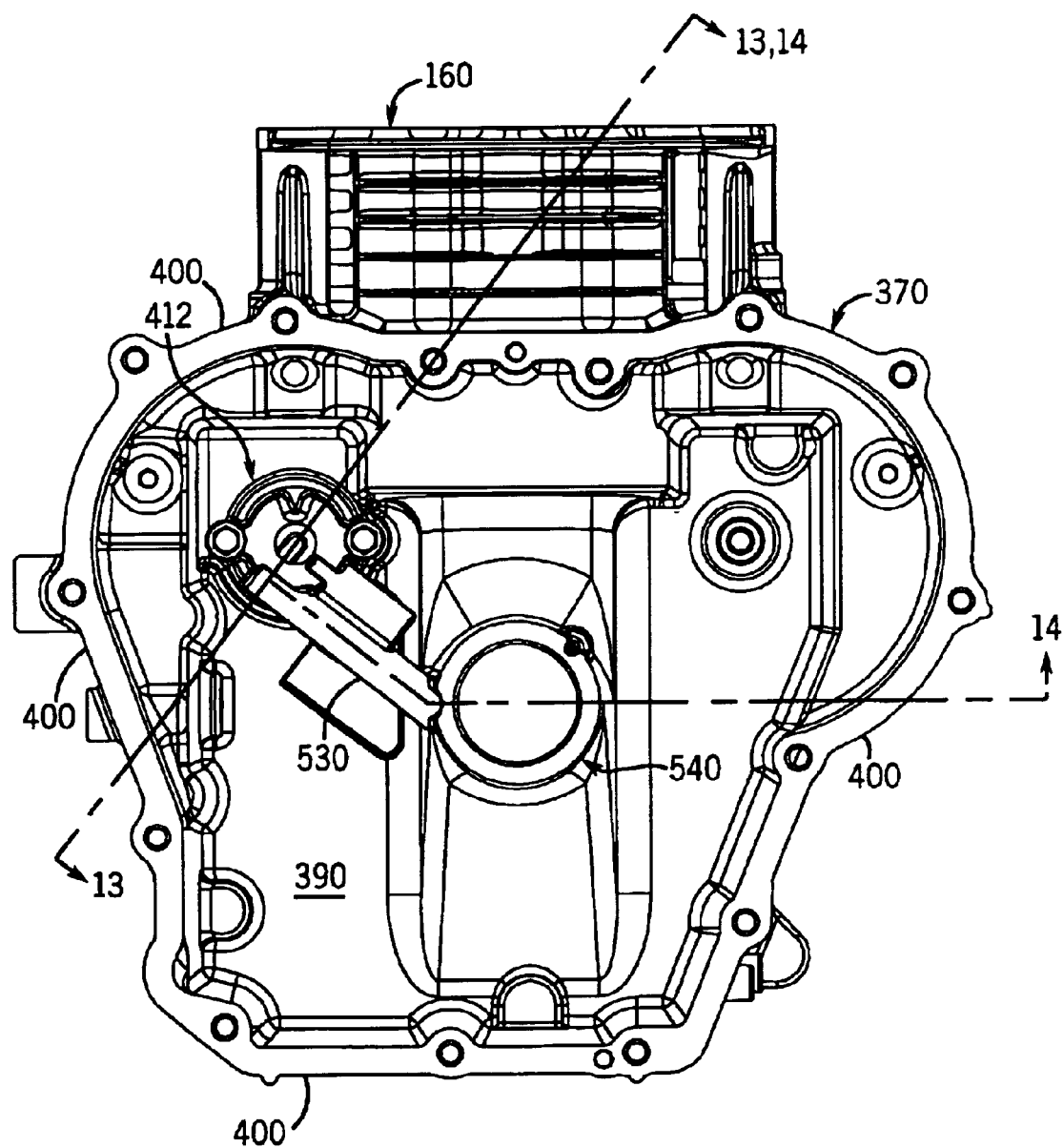
FIG. 9 is a top view of the bottom of the crankcase and the cylinder of the single cylinder engine of FIG. 1, which in particular shows a pump.
Figure 10:
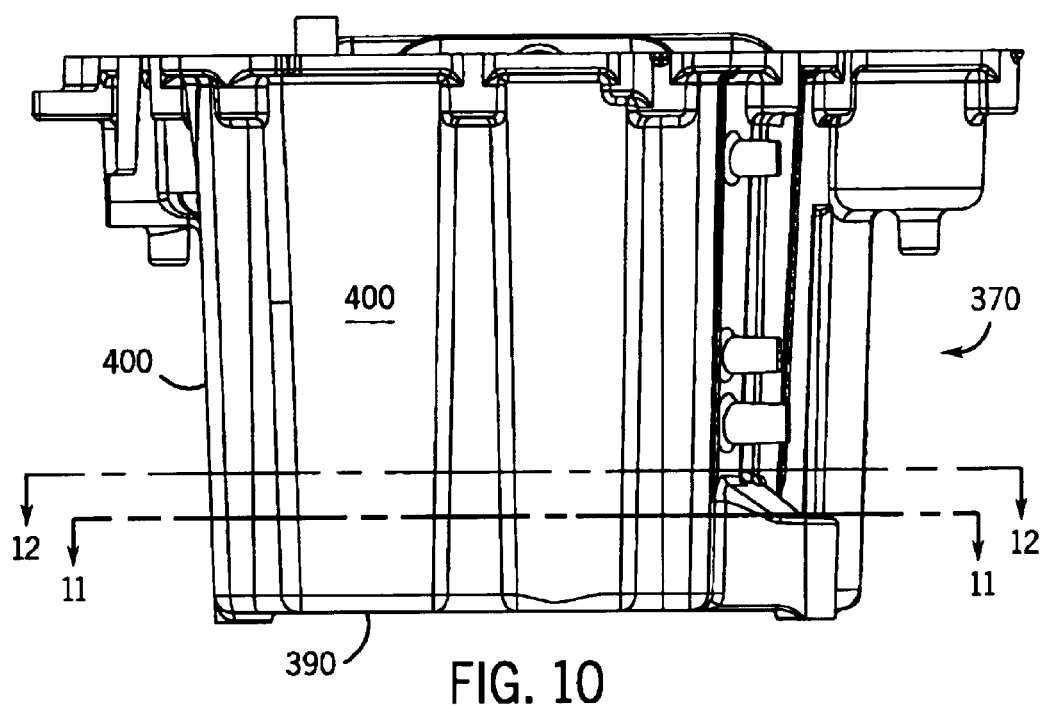
FIG. 10 is an elevation view of the bottom of the crankcase of the single cylinder engine of FIG. 1, as viewed from the side of the crankcase opposite the cylinder.

Turning to FIGS. 9 and 10, a top view and an elevation view (as viewed from the side wall 400 opposite the cylinder 160) of the bottom 370 of the crankcase 110 are provided. FIG. 9 in particular shows the pump 412 supported by the floor 390 of the crankcase. Further referring to FIGS. 11–14, the pump 412 is shown in greater detail. As shown particularly with respect to FIGS. 11–12, which are sectional views of the pump 412 taken along lines 11—11 and 12—12 of FIG. 10, respectively, the pump in a preferred embodiment is a gerotor pump (or, alternatively, a crescent pump) of conventional design having an inner gear 510 positioned within an outer ring gear 515 having gear teeth along its inner circumference.

Figure 13:
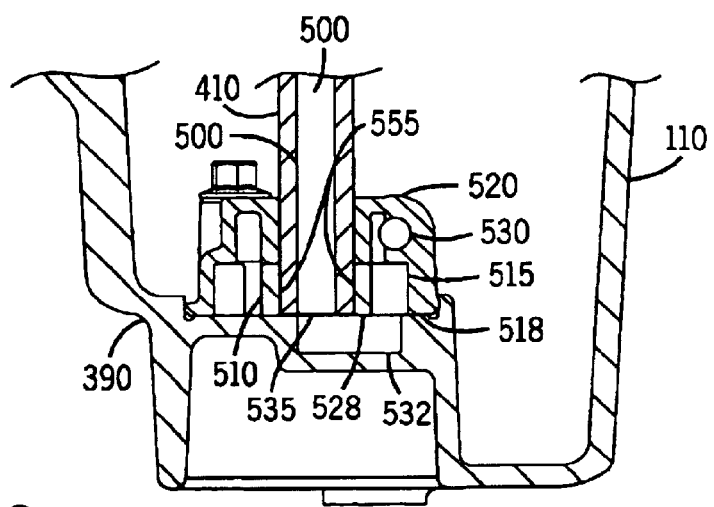
FIG. 13 is a cross-sectional side view of the bottom of the crankcase of FIGS. 9–10 and the pump of FIGS. 11–12, taken along line 13—13 of FIG. 9.
Figure 14:
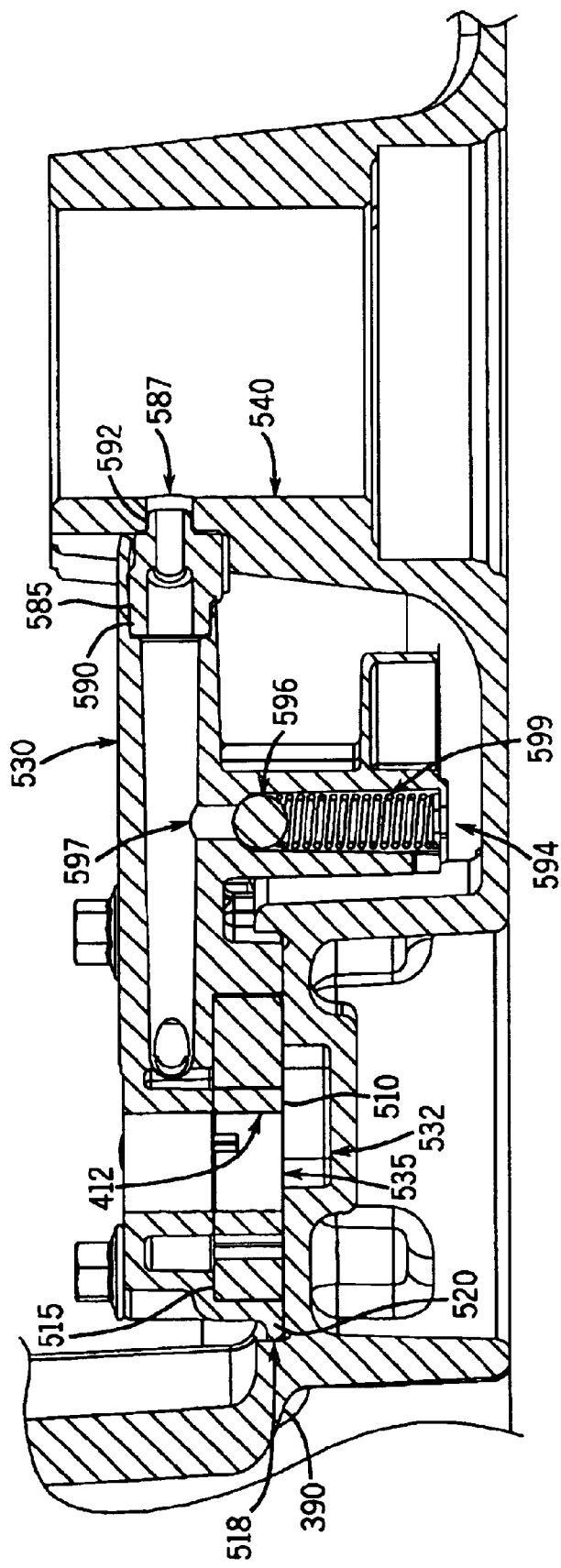
FIG. 14 is a cross-sectional side view of the bottom of the crankcase of FIGS. 9–10 and the pump of FIGS. 11–12, taken along line 14—14 of FIG. 9, which in particular shows an oil passage connecting the pump with a crankshaft bearing.

As shown in FIGS. 13–14, which are cross-sectional views taken along lines 13—13 and 14—14 of FIG. 9, respectively, the inner gear 510 and the outer ring gear 515 are contained within a housing 520 that rests within a cavity 518 in the floor 390 of the crankcase 110. In the embodiment shown, the gears 510,515 specifically rest upon the floor 390, and the housing 520 extends upward from the floor 390 around the gears. However, in alternate embodiments, the gears 510,515 are fully contained within the housing, which in turn rests upon the floor 390. The housing is made from a rigid material so that the dimensional envelope around the gears 510,515 is more accurate to provide improved performance of the pump 412.

Figure 11:
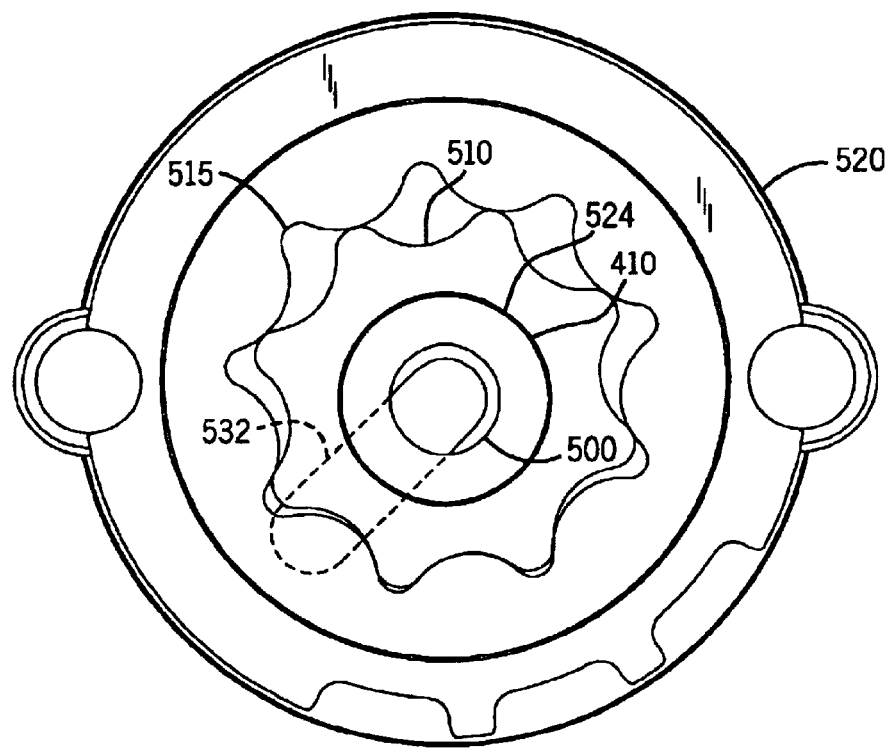
FIGS. 11 and 12 are cross-sectional views of one embodiment of the pump shown in FIG. 9, taken along lines 11—11 and 12—12 of FIG. 10.

Particularly as shown in FIGS. 11 and 13, the inner gear 510 has an interior hole 524 through which is positioned the camshaft 410. Thus, the internal channel 500 of the camshaft 410 extends all of the way to a bottom side 528 of the inner gear 510. The inner gear 510 is press fit onto, or otherwise coupled to, the camshaft 410. Consequently, when the camshaft 410 is driven to rotate, this causes the inner gear 510 and thus the outer ring gear 515 to rotate within the housing 520. The floor 390 of the crankcase 110 or, in alternate embodiments, a portion of the housing 520, supports the inner gear 510 and the camshaft 410 and consequently forms a lower camshaft bearing 555 for that camshaft.

Figure 12:
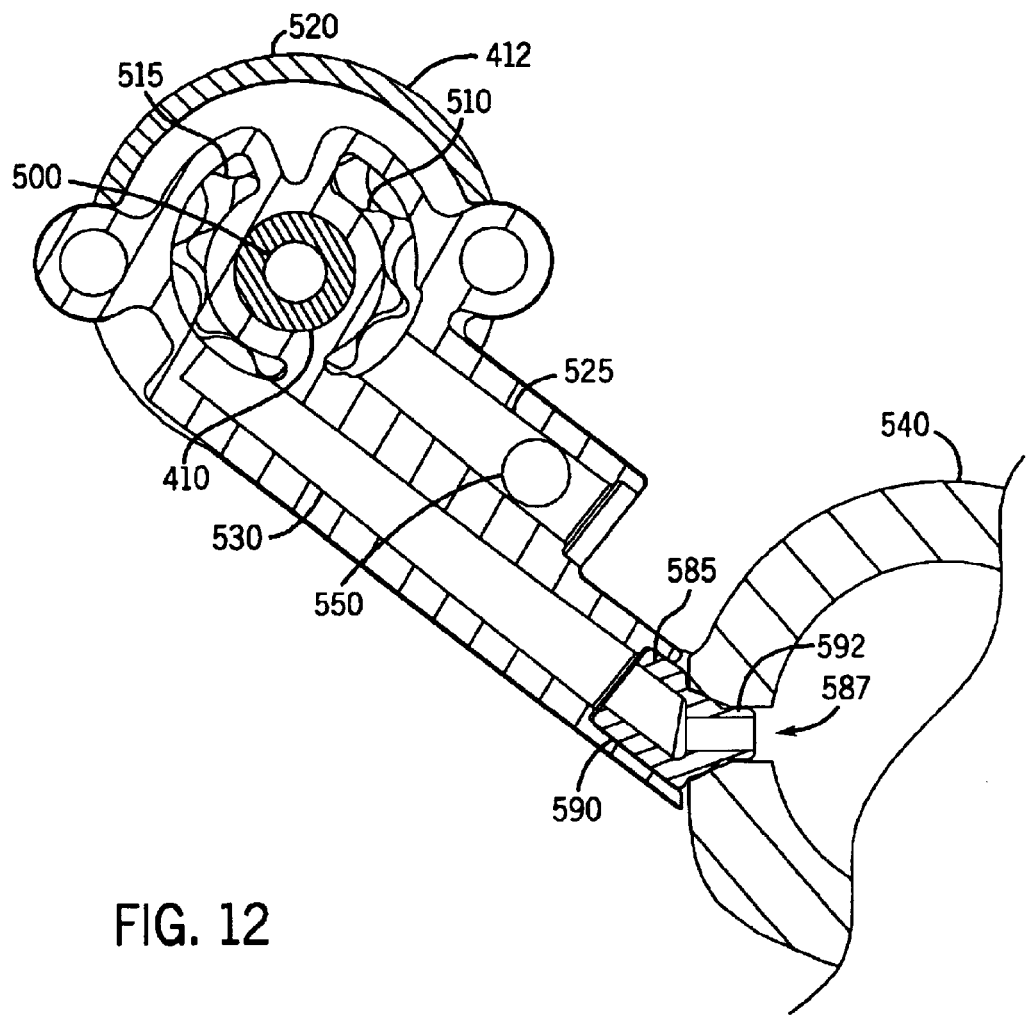

Referring to FIG. 12, as with other gerotor (or crescent) pumps, the inner gear 510 of the pump 412 has a fewer number of gear teeth than the outer ring gear 515 and the two gears have center axes that are somewhat offset from one another. Consequently, when the gears 510 and 515 rotate, a partial vacuum is created within an inlet tube 525 of the pump 412 so that oil is drawn into the pump 412 from along the floor 390 of the crankcase outside the housing 520 at an inlet orifice 550. Further, referring also to FIG. 13, the oil that is drawn into the pump 412 due to operation of the pump in turn is pumped out of the pump at both an outlet 535 and a crankshaft bearing outlet 530.

As shown in FIGS. 11, 13 and 14, the outlet 535 is formed by a slot 532 within the floor 390 of the crankcase 110 (or otherwise within the housing 520) that extends radially from between the inner and outer ring gears 510,515 under the inner gear to the interior hole 524. Due to the positioning of the outlet 535, the inner gear 510, the camshaft 410 and the internal channel 500, some of the oil that is pumped out of the outlet lubricates the lower bearing 555 of the shaft/inner gear. Other oil that is pumped out of the outlet 535 is pumped up through the internal channel 500 of the camshaft 410. This oil provides lubrication for a number of other components of the engine 100, as discussed further with respect to FIGS. 16–17.

As shown in both FIGS. 12 and 14, the crankshaft bearing outlet 530 is a tube that extends from the pump 412 along the top of the pump almost to the lower crankshaft bearing 540 for supporting the crankshaft 220. An additional connecting device 585 is employed to connect the crankshaft bearing outlet 530 to the lower crankshaft bearing 540 and further through an orifice 587 in the bearing to the interior of the bearing, thus completing an oil passage from the pump 412 to the bearing 540. The connecting device 585 in one embodiment is a rubberized tube having a first end 590 designed to extend into the crankshaft bearing outlet 530, and a second end 592 designed to fit into the orifice 587. Oil flows through the connecting device 585 from the crankshaft bearing outlet 530 into the lower crankshaft bearing 540. In the embodiment shown in FIG. 14, the crankshaft bearing outlet 530 also includes a pressure relief valve 594 that allows oil to exit out of the crankshaft bearing outlet 530 by way of a hole 597 in that outlet, so that oil can exit the system if oil pressure becomes excessive. In the embodiment shown, the valve 594 includes a ball 596 and spring 599, although other types of valves can also be employed.

Figure 15:
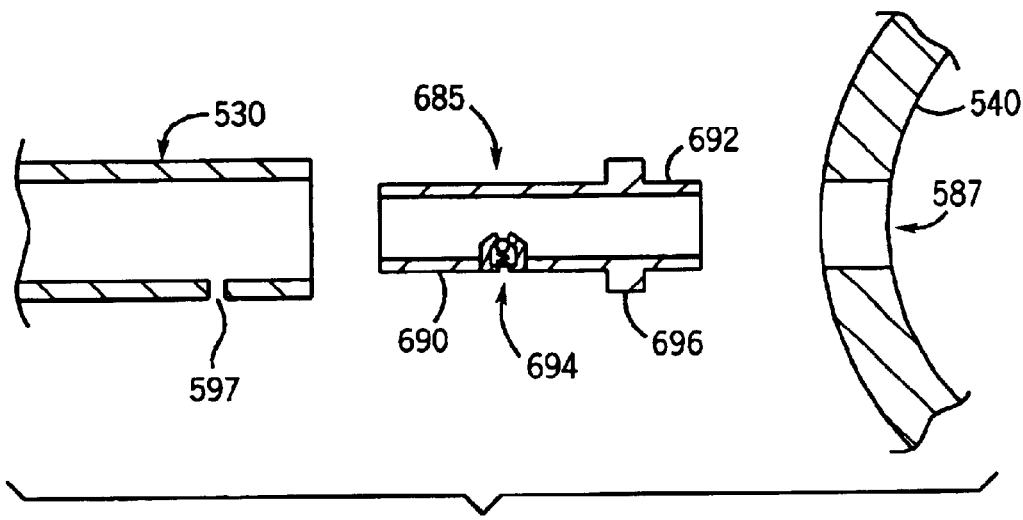
FIG. 15 is an exploded view of an alternate embodiment of an oil passage connecting a pump with a main crankshaft bearing (in contrast to that of FIG. 14)

Referring to FIG. 15, an exploded view of an alternate embodiment of oil passage to that of FIGS. 12 and 14 is shown. Specifically, FIG. 15 shows an alternate connecting device 685 that connects the crankshaft bearing outlet 530 and the bearing 540. Specifically, the connecting device 685 has a first end 690 that is separated from a second end 692 by a rim 696 extending out from the connecting device in between the first and second ends. The rim 696 keeps the connecting device 685 in position relative to the crankshaft bearing outlet 530 and the lower crankshaft bearing 540. The first end 690 is sufficiently long that it extends past the hole 597, and a ball-and-spring valve 694 (or another type of valve) is supported by the first end 690 at a location that is aligned with the hole 597 when the connecting device 685 is inserted into the outlet 530.

Figure 16:
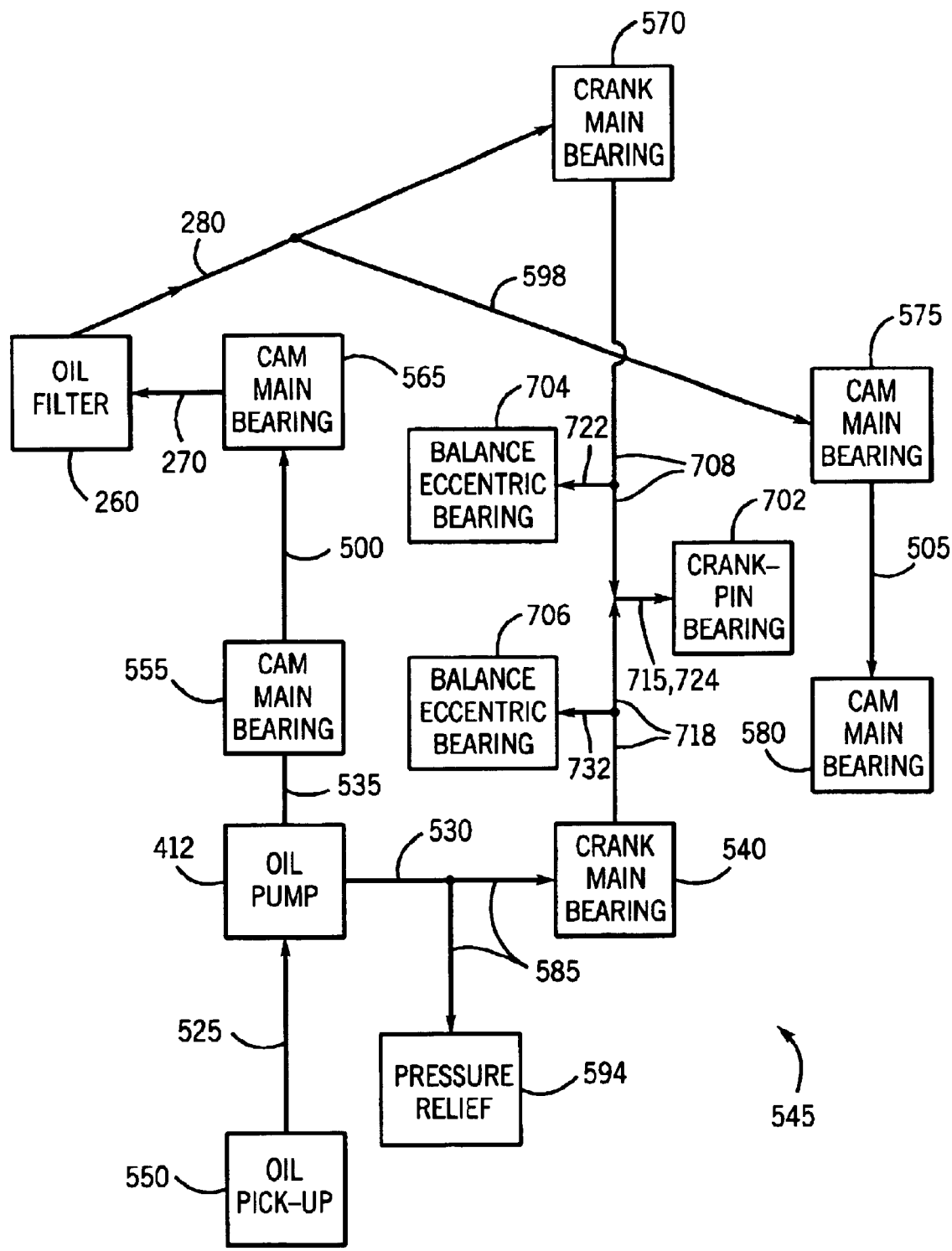
FIG. 16 is a block diagram showing an oil circuit within the single cylinder engine of FIG. 1.

Referring to FIG. 16, a block diagram shows schematically an overall oil circuit 545 of the engine 100 by which oil is pumped from the floor 390 of the crankcase 110 to various components within the engine. As shown, oil is drawn into the inlet tube 525 at the inlet orifice 550, which forms an oil pick-up along the floor 390 of the crankcase 110. The oil is then provided to the oil pump 412. In the embodiment shown, the oil pump 412 pumps some of the oil out at the outlet 535 at the lower camshaft bearing 555 for the camshaft 410, and pumps the remainder of the oil out through the crankshaft bearing outlet 530. The oil pumped out of the crankshaft bearing outlet 530 in turn is provided, by way of the connecting device 585 (or the connecting device 685), to the lower crankshaft bearing 540 and/or back to the floor 390 of the crankcase 110 (outside of the pump 412) by way of the pressure relief valve 594 (or valve 694) and hole 597. In alternate embodiments, some of the oil is pumped out at the outlet 535, while the remainder of the oil is pumped elsewhere to locations other than, or in addition to, the crankshaft bearing outlet 530. In further alternate embodiments, all of the oil is pumped out at the outlet 535.

Most of the oil pumped out at the outlet 535 does not remain at the lower camshaft bearing 555 but rather proceeds up through the internal channel 500 of the camshaft 410 and out along an upper camshaft bearing 565 of that camshaft. Most of the oil then proceeds through the incoming line 270 to the oil filter 260, at which the oil is filtered. Once filtered, the oil proceeds through the outgoing line 280. Some of the oil is deposited at an upper crankshaft bearing 570, while some of the oil further proceeds along an additional line 598 to an upper camshaft bearing 575 of the shaft 415. A portion of that oil further then proceeds down the internal channel 505 of the shaft 415 to the remaining, lower camshaft bearing 580 of that shaft along the bottom 370 of the crankcase 110.

Figure 17:
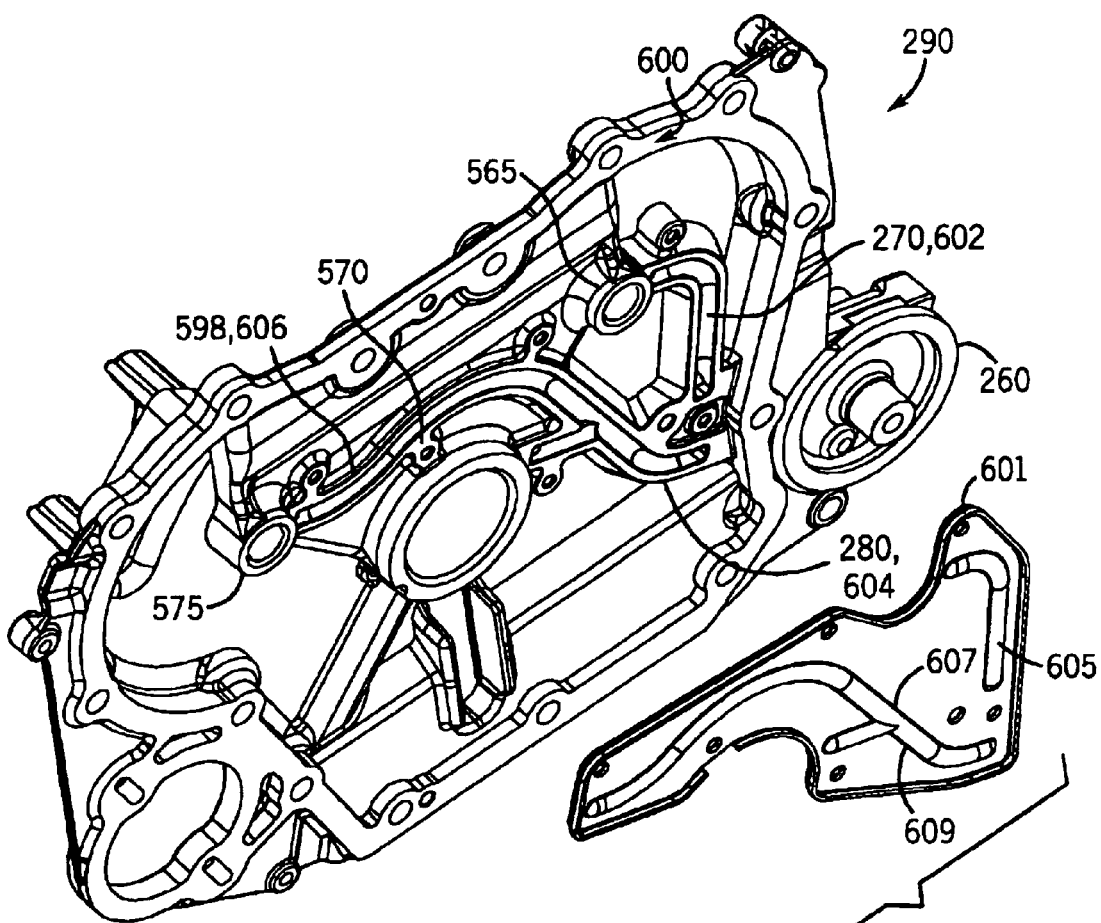
FIG. 17 is a view of a lower side of the top of the crankcase of the single cylinder engine shown in FIG. 6, with a plate used to cover molded passages within the top shown exploded from the remainder of the top.

FIG. 17 shows an interior side 600 of the top 290 of the crankcase 110 to further clarify the design of the oil circuit 545. In particular, the upper camshaft bearings 565,575 for supporting the respective camshafts 410,415 and the upper crankshaft bearing 570 for supporting the crankshaft 220 are shown. Also shown are indentations 602,604 and 606 molded in the top 290 to form the incoming, outgoing and additional lines 270,280 and 598 that respectively couple the upper camshaft bearing 565 with the oil filter 260, and couple the oil filter with the upper crankshaft bearing 570 and with the upper camshaft bearing 575. The indentations 602,604 and 606 are semicircular in cross section, and the lines 270,280 and 598 are formed by covering the indentations with a panel 601.

Although the panel 601 can be flat, in the embodiment shown the panel has grooves 605,607 and 609 that complement the indentations 602,604 and 606 to form the lines 270,280 and 598, respectively. The panel 601 can be attached to the top 290 by way of screws or other fastening components or methods. The exact paths of the incoming and outgoing lines 270,280 shown in FIG. 8 are somewhat different than those shown in FIG. 7, insofar as the paths shown in FIG. 7 are straight while those of FIG. 8 are more curved. Thus, depending upon the embodiment, the incoming, outgoing, and additional lines 270,280 and 598 can follow a variety of different paths. This manner of creating the lines 270,280 and 598 by way of molded indentations and the panel 601 is simpler and more cost-effective than alternative methods in which enclosed channels are fully cast into the top 290 through the use of cores, metal tubes, etc., or drilled, although the lines could be created using such other methods in alternate embodiments.

Figure 18:
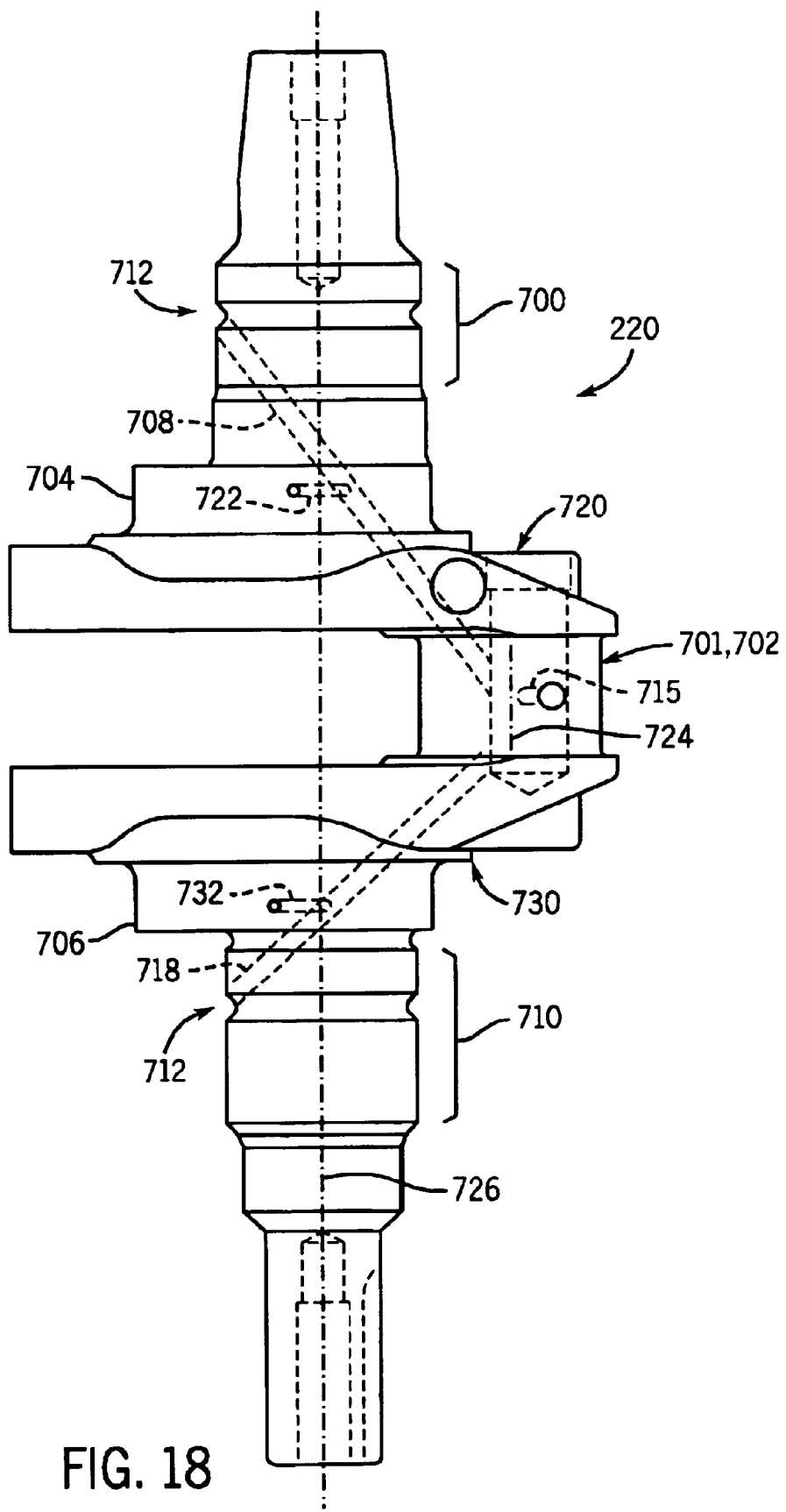
FIG. 18 is a side elevation view of an exemplary crankshaft capable of being employed within the single cylinder engine of FIG. 1.

Referring again to FIG. 16 and additionally to FIG. 18, the oil provided to the upper and lower crankshaft bearings 570,540 serves both to lubricate the crankshaft bearings themselves as well as to lubricate other bearings along the length of the crankshaft 220. As shown in FIG. 18, each of an upper shaft bearing portion 700 and a lower shaft bearing portion 710 along the crankshaft 220 includes a respective annular concave groove 712 into which oil is delivered by way of the upper and lower crankshaft bearings 570,540 (e.g., by way of holes in those bearings). Upper and lower bores 708 and 718 drilled within the crankshaft 220 respectively extend from the respective grooves 712 of the upper and lower shaft bearing portions 700,710 through upper and lower crankarms 720 and 730, respectively, to an internal channel 724 extending within a crankpin 701 of the crankshaft generally parallel to a central axis 726 of the crankshaft 220.

As shown, the upper and lower bores 708,718 extend at oblique angles between the grooves 712 and the crankpin 701, relative to the central axis 726. By drilling the bores 708,718 in this manner, each of the bores 708,718 can respectively be formed simply by drilling a single straight hole. Nevertheless, in the embodiment shown, three other bores must be drilled in order to communicate oil to three different locations along the crankshaft 220. First, the crankpin 701 includes a first additional bore 715 that connects the internal channel 724 to an outer surface of the crankpin that forms a crankpin bearing 702. Thus, oil provided to the internal channel 724 by way of the upper and lower bores 708,718 in turn is communicated to the outside of the crankpin 701 to provide lubrication to the crankpin bearing 702.

Also as shown in FIG. 18, the crankshaft 220 includes first and second eccentric bearings 704 and 706, respectively, which support the one or more counterbalances 440. The first eccentric bearing 704 specifically is positioned along the crankshaft 220 between the upper crankarm 720 and the upper shaft bearing portion 700, while the second eccentric bearing 706 is positioned between the lower crankarm 730 and the lower shaft bearing portion 710. In order to provide oil to the first and second eccentric bearings 704 and 706, second and third additional bores 722 and 732, respectively, are drilled to link the respective upper and lower bores 708,718 with the upper and lower eccentric bearings, respectively.

The first, second, and third additional bores 715,722 and 732 generally are oriented so that the bores reach the surfaces of the crankpin bearing 702, first eccentric bearing 704, and second eccentric bearing 706 proximate side edges of those bearings. That is, the bores 715,722 and 732 are generally oriented so that the bores do not reach the surfaces of the bearings near the portions of the bearings that are most distant from, or least distant from, the central axis 726. These orientations of the bores 715,722 and 732 are chosen so that, during operation of the engine, pressure applied to the bearings by the connecting rod 420 or counterbalances 440 does not undesirably limit or excessively enhance oil flow out of the bores.

FIG. 16 shows in schematic form that oil pumped to the upper and lower crank main bearings 570 and 540 in turn is pumped through each of the upper and lower bores 708,718 toward the crankpin bearing 702 by way of the internal channel 724 and the first additional bore 715, and additionally is pumped through the second and third additional bores 722,732 to the upper and lower eccentric bearings 704,706. Although the embodiment of FIG. 16 provides dual oil flow paths to the crankshaft 220 via each of the upper and lower crank main bearings 570,540, in alternate embodiments, a single flow path would suffice. For example, if oil were no longer pumped via the connecting device 585 to the lower crank main bearing 540, the crankshaft 220 would still be provided with oil via the upper crank main bearing 570 and, additionally, the lower crank main bearing 540 would still be provided with oil via the upper and lower bores 708,718 and the internal channel 724. Such an alternate flow path could be desirable in circumstances where it was desired that all oil provided to the crankshaft 220 be filtered via the oil filter 260 prior to being provided to the crankshaft.

The embodiments discussed above have various advantages in comparison with conventional systems. In particular, because oil is conducted through the camshafts 410 and 415, oil passages do not need to be cast or otherwise created in the sides of the walls of the crankcase in order to provide oil from the floor of the crankcase to the bearings along the top of the crankcase. Further, because the top 290 is removable and can be simply manufactured to include the incoming, outgoing and additional lines, the costs associated with manufacturing the oil circuit providing oil to the oil filter and to the various bearings along the top of the crankcase are further reduced in comparison with conventional designs. Also, given the ability of the crankshaft 220 to conduct oil between the upper and lower crank main bearings 570,540, only one of the upper and lower crank main bearings needs to be supplied by oil via the outgoing line 280 or the connecting device 585, respectively.

Also, since the first and second camshafts 410,415 including the gears 320,325 and the cams 360,365 are respectively identical, and each camshaft includes only a single cam, these parts can be inexpensively manufactured by way of injection molding, from materials such as robust plastics that produce relatively little noise during operation of the engine as the cams interface the push rods of the engine. Additionally, the twin-cam design has the added benefit that the push rods, rocker arms and valves corresponding to the intake and exhaust valves are positioned on opposite sides of the cylinder and cylinder head, such that the valve bridge area 610 is more exposed to air being blown by the fan and therefore is more effectively cooled.

Further, the providing of oil to the upper and lower eccentric bearings 704,706 via the second and third additional bores 722,732 allows for smoother and more efficient operation of the counterbalances 440 that ride upon those eccentric bearings in comparison with designs that do not directly pump oil to those bearings. The present invention is intended to encompass other designs of crankshaft oil circuits in which oil is pumped to eccentric bearing surfaces for supporting balance weights via bores or other channels, regardless of whether such crankshaft oil circuits employ the specific bores (e.g., the upper and lower bores 708,718) shown in FIG. 18.

Figure 19:
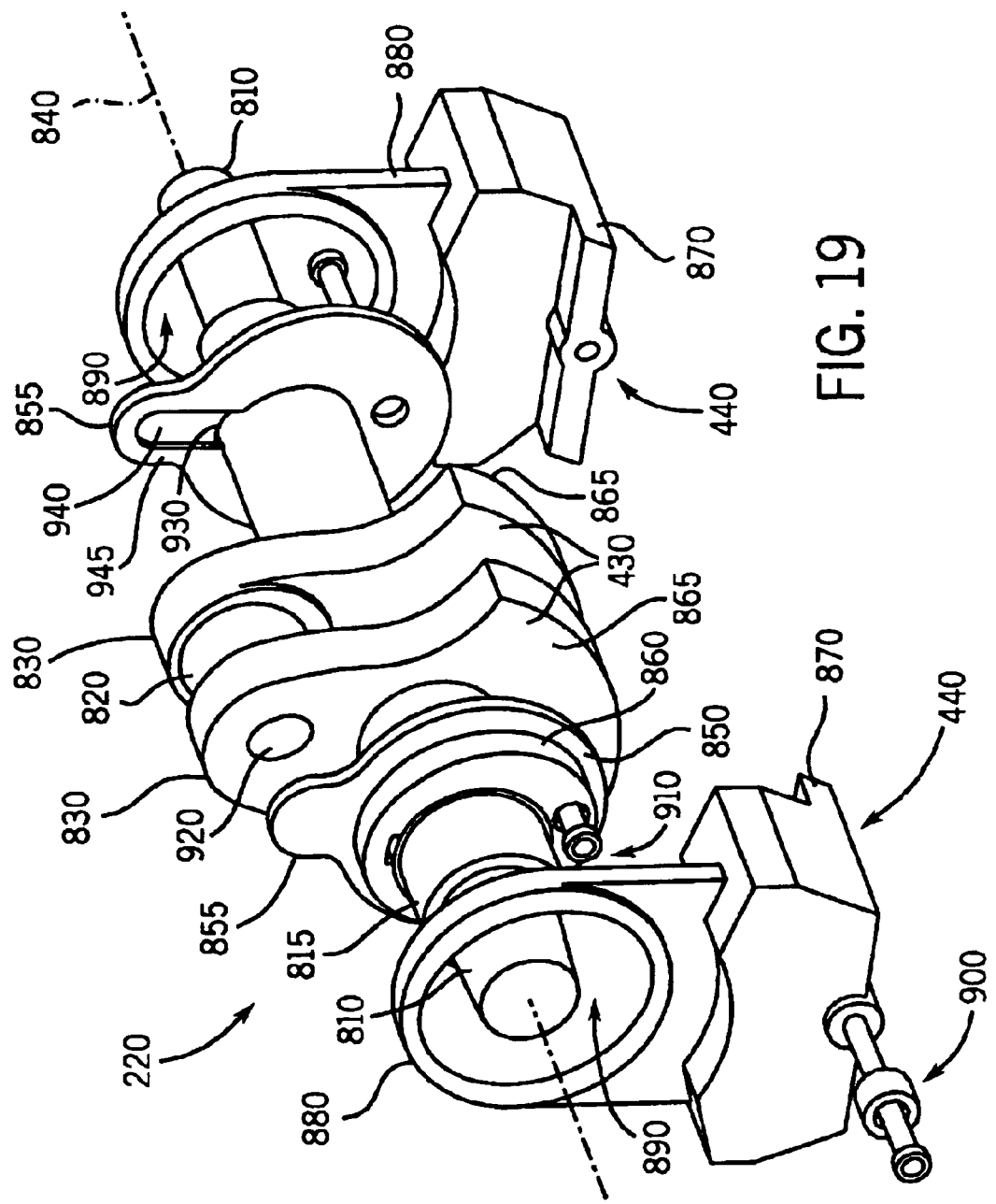
FIG. 19 is an exploded, perspective view of components associated with an alternate exemplary crankshaft capable of being employed within the single cylinder engine of FIG. 1.
Figure 20:
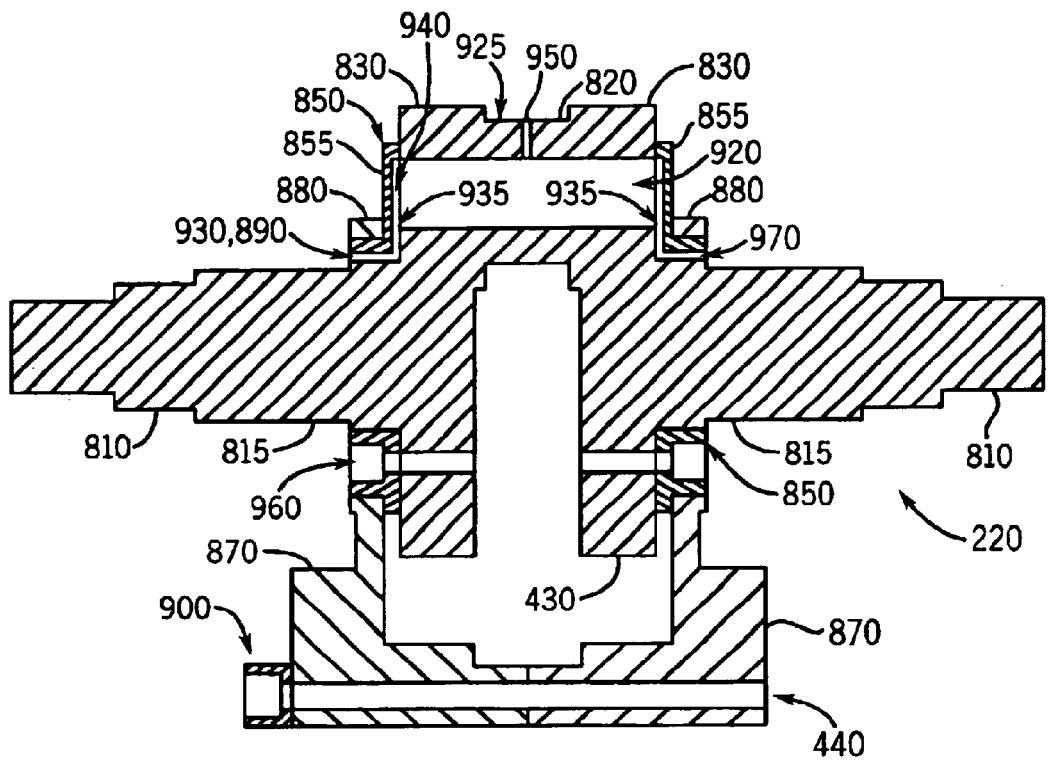
FIG. 20 is a cross-sectional view of components of the crankshaft of FIG. 19 taken along a central axis of the crankshaft.
Figure 21:
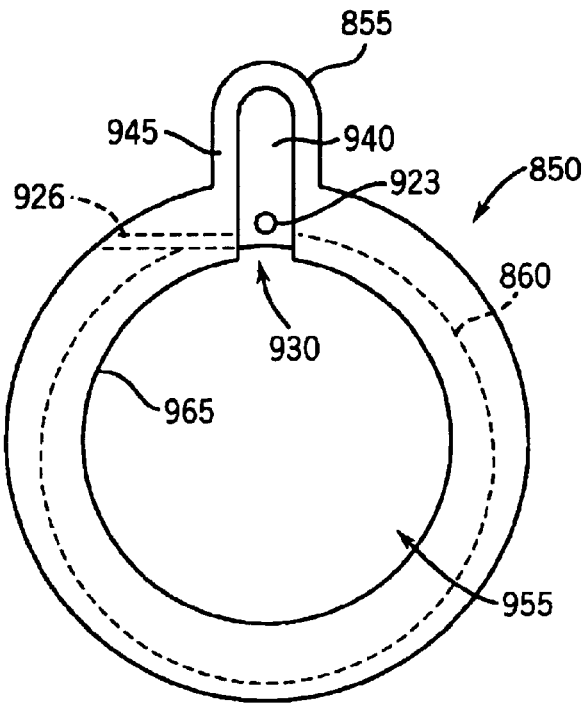
FIG. 21 is an elevation view of one of a pair of flanges that are part of the crankshaft of FIG. 19.

In this regard, a second embodiment of a crankshaft 820 and component parts is shown in FIGS. 19–21. FIG. 19 in particular provides an exploded, perspective view of the components of the crankshaft 820 and the counterbalances 440, while FIG. 20 provides a cross-sectional view of these components when fully assembled. As shown, the crankshaft 820 includes a pair of main segments 810, a crank pin 820, and a pair of crank arms 830 that respectively couple the crank pin to the respective main segments. When assembled within the engine 100, the connecting rod 420 connects the crank pin 820 to the piston 210 (see FIG. 7). The rotating counterweight 430 is formed by a pair of weights that are respective extensions of the respective crank arms 830, diametrically opposite from the crank pin 820 across a central axis 840 of the crankshaft 820. In alternate embodiments, the rotating counterweight 430 need not include two separate weights, and need not be integrally formed as part of the crank arms 830.

Further as shown in FIGS. 19 and 20, flanges 850 having eccentric rims 860 are respectively positioned onto the respective main segments 810. When fully assembled onto the crankshaft 820, the flanges 850 are respectively positioned so that respective inner edges 945 of the flanges abut respective outer sides 865 of the crank arms 830. In the present embodiment, the flanges 850 each include a respective protrusion 855 that extends radially outward away from the central axis 840. Specifically, the respective protrusions 855 extend alongside the respective outer sides 865 of the crank arms 830. Further, respective outer edges 965 (see FIG. 21) of the flanges 850 surround, and are supported by and in contact with (e.g., abut), the respective main segments 810. The pair of counterbalances 440, each of which has a weight portion 870 and a coupling arm 880 with a circular cavity 890, are also fit onto the crankshaft 820, such that the circular cavities 890 respectively fit around the eccentric rims 860. Due to the eccentric rims 860, the center axes of the circular cavities 590 (not shown) are displaced from the central axis 840. Consequently, when the crankshaft 820 rotates, the counterbalances 440 move toward and away from the crankshaft, and act as a balance of some of the forces of the reciprocating piston 210. The two counterbalances 440 are held together by a pin 900. Also, the flanges 850 are held against the crank arms 830 by way of an additional pin 910.

Further as shown, a crankshaft oil circuit is provided with respect to the crankshaft 820 to allow lubricant to flow along the entire length of the crankshaft unimpeded by the existence of the crank arms 830 and the crank pin 820, and also to provide lubrication of the interface between the crank pin 820 and the connecting rod 420 as well as the interfaces between the eccentric rims 860 and the circular cavities 890. FIGS. 19 and 20 show that the crank pin 820 includes a channel or oil galley 920 (also termed an oil gallery) through which lubricant is able to flow. The oil galley 820 can be simply formed within the crank pin 820 during casting of the crank pin. When supported by the crank arms 830, the crank pin 820 and its oil galley 920 extend the entire distance between the outer sides 865 of the crank arms. In alternate embodiments, the crank pin only extends up to the crank arms or partly through the crank arms rather than the entire distance between the outer sides 865. In such embodiments, the crank arms 830 additionally are formed with holes that extend the oil galley 920 to the outer sides 865 of the crank arms. Also, while the crank pin 820 is typically a part that is distinct from the respective crank arms 830, in certain embodiments the crank pin and one or both of the crank arms are integrally formed as a single part.

Referring additionally to FIG. 21, which provides an elevation view of one of the flanges 850, each of the flanges includes a first groove 930 along the respective outer edge 965 of the flange, and also includes a second groove 940 along the respective inner edge 945 and the respective protrusion 855 of the flange. When the flanges 850 are positioned on the main segments 810 of the crankshaft 820 to abut the respective crank arms 830, the first grooves 930 extend in directions parallel to the central axis 840 from the respective inner edges 945 of the flanges to the ends of the flanges, e.g., to respective exterior portions 815 of the main segments 810. The second grooves 940 respectively extend radially outward from the respective outer edges 965 of the flanges 850, sufficiently far that the second grooves reach the corresponding open ends of the oil galley 920.

The first and second grooves 930,940 of each flange 850 are coupled to one another at the location where the inner and outer edges 945,965 of the flange meet. Consequently, when the respective flanges 850 are positioned onto the respective main segments 810, such that the outer edges 965 abut the main segments 810 and the inner edges 945 abut the outer sides 865 of the respective crank arms 830, respective passages 935 are formed by the respective sets of grooves 930,940 (as shown best in FIG. 20). Lubricant such as oil 970 is therefore able to flow through the passages 935 between the exterior portions 815 of the main segments 810 and the oil galley 920. Lubricant is able to arrive at the passages 935 when provided by way of the crank main bearings 570,540 to the exterior portions 815 of the main segments (which correspond to portions 700,710 shown in FIG. 18), since some of the lubricant that is provided to those portions 815 proceeds into the passages 935.

As shown in FIG. 20, in the present embodiment, an additional channel 950 connecting the oil galley 920 to the exterior of the crank pin 820 is also provided. The additional channel 950 allows oil to flow also between the oil galley 920 and the outer surface 925 (or crank pin bearing) of the crank pin 820, thereby allowing for lubrication of the interface between the crank pin and the connecting rod 420. Although in FIG. 20, the additional channel 950 is shown to proceed outward from the oil galley 920 toward the portion of the outer surface 925 that is farthest from the central axis 840, in alternate embodiments the channel will proceed toward a portion of the outer surface that is intermediate the portions that are farthest from and closest to the central axis 840, so that oil flow to the outer surface 925 is not impeded or overly enhanced due to the interaction between the connecting rod 420 and the outer surface.

As further shown in FIG. 21, in certain embodiments, the flanges 850 include one or more additional channels that allow some of the oil provided through channels 935 to flow outward onto the eccentric rims 860. For example, in one embodiment, each flange 850 includes a first outlet 923 that is generally directed parallel to the central axis 840 along the first groove 930 linking the eccentric rim 860 of the flange 850 with the second groove 940. In another embodiment, each flange 850 includes a second outlet 926 that is generally perpendicular to the central axis 840 and also perpendicular to the second groove 940 that connects the second groove to the eccentric rim 860. This embodiment is preferred to the preceding embodiment insofar the oil is not delivered to either the portion of the eccentric rim 860 that is closed to the central axis 840 or the portion of the eccentric rim that is farthest from the central axis. Consequently, as discussed above with respect to the embodiment shown in FIG. 18, oil is neither excessively prevented from flowing out onto the eccentric rim 860 or excessively encouraged to flow onto the eccentric rim. In alternate embodiments, the eccentric rims 860 could instead include one or more passages connecting the grooves 930 to the eccentric rims. In further alternate embodiments, several of the above passages could be created.

Referring again to FIG. 16 in addition to FIGS. 19–21, certain components of the crankshaft 820 correspond to and perform the same general functions as the components 702,704,706,708,715,718,722,724 and 732 shown in FIG. 16. Specifically, the crankpin bearing 702 and eccentric bearings 704,706 respectively correspond to the outer surface 925 and the eccentric rims 860 of the first and second flanges 850. Additionally, the upper and lower bores 708,718 of FIG. 16 (as well as FIG. 18) respectively are replaced by the passages 935 of the respective flanges 850 as formed by the inner and outer grooves 930,940 of each respective flange. The oil galley 920 of the crankshaft 820 corresponds to the internal channel 724, and the additional channel 950 corresponds to the first additional bore 715. Finally, one or both of the first and second outlets 923,926 (or other passages, depending upon the embodiment) of each respective flange 850 corresponds to the second and third additional bores 722,732 of FIGS. 16 and 18.

Although the engine 100 shown in FIGS. 1–8 is a vertical crankshaft engine, the oil circuit described with respect to FIGS. 9–21 can be employed in its present or modified forms in a variety of engines having either vertical or horizontal crankshafts. With respect to horizontal crankshaft engines, the oil can flow through the crankshaft oil circuit because it is pumped, because of a slightly tipped orientation of the engine, or by way of other methods known in the art. Although pumping of the oil can also be employed with respect to vertical crankshaft engines, gravity alone is often sufficient to cause oil to flow downward along/through the crankshafts 220,820, through their various passages shown in FIGS. 18–21 (e.g., passages 708,718,724,722,732,715, 935,920, etc.).

In alternate embodiments, the exact shapes of crankshafts 220,820 and components of the crankshafts such as the passages formed by the bores 708,718, the flanges 850, the protrusions 855, and the first and second grooves 930,940 can be modified from those shown in FIGS. 18–21. For example, the flanges 850 could have, in one alternate embodiment, a cross-sectional shape (viewed perpendicular to the central axis 840) that is identical to the outer sides 865 of the crank arms 830 to which the flanges are attached. Additionally, complementary grooves can be provided in the main segments 810 and/or the crank arms 830 to interface the first and second grooves 930,940 or, in further embodiments, the grooves are entirely provided as indentations in the exterior surfaces of the main segments and the crank arms 830, while the inner and outer edges 945,965 of the flanges 850 remain flat. In further alternate embodiments, the first and second grooves 930,940 can be replaced with first and second channels that are fully enclosed within the flanges 850 or other components.

Also in certain alternate embodiments, lubrication is provided to the outer surface 925 forming the interface between the connecting rod 420 and the crank pin 820 in another manner, such that the additional channel 950 is not required. In further alternate embodiments, the oil galley 920 need not have a strictly cylindrical shape, nor need the oil galley extend fully between the two outer sides 865. For example, in certain embodiments, the purpose of the crankshaft oil circuit will be simply to allow lubricant to flow between the oil galley and one of the main segments 810, rather than to allow lubricant to flow from one main segment, past the crank pin and crank arms, to the other main segment.

Additionally, while in the present embodiment, the flanges 850 serve both the purpose of creating a crankshaft oil circuit and the purpose of supporting the counterbalances 440, in alternate embodiments, two distinct parts can be employed for these separate purposes. Further, oil circuits such as the present embodiment can be employed in engines that are not single-cylinder engines, that is, engines that do not require counterbalances 440 and consequently do not require the flanges 850 to support the counterbalances. For example, in one alternate embodiment, the oil galley 920 would be coupled to the main segments 810 by passages 935 formed by flanges or other components positioned next to the crank arms 830, where these components did not have the eccentric rims 860. Also, such multi-cylinder engines could employ one or more crankshafts having one or more crank pins and sets of crank arms, all or any subset of which could employ passages/channels/oil galleys as described above to form one or more oil circuits.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. For example, other types of pumps can be employed in place of the gerotor/crescent pumps shown. Accordingly, reference should be made to the following claims, rather than to the foregoing specification, as indicating the scope of the invention.

What is claimed is:

1. An internal combustion engine comprising:
   a crankcase;
   a pump supported by the crankcase, the pump including an inlet and a first outlet;
   a first camshaft having a first channel extending between first and second ends of the first camshaft, wherein the first camshaft end is supported at least indirectly by one of the pump and the crankcase, and wherein lubricant is provided from the pump to the first channel at the first end and communicated by way of the first channel to the second end;
   a crankshaft supported by the crankcase;
   a second channel communicating at least a first portion of the lubricant delivered to the second end of the first camshaft by way of the first channel to a first crankshaft bearing of the crankshaft; and
   a third channel within the crankshaft that receives at least a second portion of the lubricant communicated by the second channel and further communicates at least a third portion of the second portion of the lubricant to a crankpin bearing on the crankshaft.

2. The internal combustion engine of claim 1, wherein one of the pump and a floor of the crankcase forms a first camshaft bearing for supporting the first camshaft end, wherein the lubricant also lubricates the first camshaft bearing.

3. The internal combustion engine of claim 1, wherein the third channel within the crankshaft includes at least a first channel portion extending from the first crankshaft bearing to an interior of a crankpin of the crankshaft, and a second channel portion extending from the first channel portion to an outer surface of the crankpin, wherein the outer surface serves as the crankpin bearing.

4. The internal combustion engine of claim 3, wherein the first channel portion is a bore extending at a first oblique angle relative to a central axis of the crankshaft between the first crankshaft bearing and the interior of the crankp in, and the second channel portion includes both a third channel portion that extends within the interior of the crankpin along a direction that is substantially parallel to the central axis and a fourth channel portion that extends from the third channel portion to the outer surface.

5. The internal combustion engine of claim 4, wherein the third channel further includes a fifth channel portion that is a bore extending at a second oblique angle relative to the central axis of the crankshaft between a second crankshaft bearing and the third channel portion, wherein at least some of the lubricant provided to the first channel portion at the first crankshaft bearing is communicated to the second crankshaft bearing.

6. The internal combustion engine of claim 1, further comprising:
   a fourth channel communicating lubricant from the pump to a second crankshaft bearing.

7. The internal combustion engine of claim 6, wherein the crankshaft further includes a fifth channel that receives at least a first portion of the lubricant communicated by the fourth channel to the second crankshaft bearing, and further communicates at least a second portion of the first portion of the lubricant communicated by the fourth channel to the crankpin bearing on the crankshaft, so that lubricant flow is provided bidirectionally to the crankshaft.

8. The internal combustion engine of claim 1,
   wherein the crankshaft includes a first eccentric bearing intended to support at least one balance weight component, and
   wherein the crankshaft includes a fourth channel coupling the third channel to an outer surface of the first eccentric bearing to communicate lubricant thereto.

9. The internal combustion engine of claim 8, wherein the third channel and the fourth channel communicate the lubricant to portions of the outer surfaces of the crankpin bearing and the eccentric bearing that are in between other portions of those outer surfaces that are farthest from and closest to a central axis of the crankshaft.

10. The internal combustion engine of claim 8, wherein the third channel extends beyond the crankpin bearing to a fifth channel coupling the third channel to an outer surface of a second eccentric bearing to communicate lubricant thereto, wherein the second eccentric bearing also is for supporting the at least one balance weight component, and wherein each of the first and second eccentric bearings are respectively positioned adjacent to a respective counterweight of the crankshaft.

11. The internal combustion engine of claim 1, wherein the crankcase includes a main portion including the floor and a plurality of sides, and further includes a top portion that is detachable from the main portion, wherein the top is molded so that an inner surface of the top includes a plurality of indentations that, when covered with a panel, form at least one channel, wherein the at least one channel includes at least a part of the second channel.

12. The internal combustion engine of claim 1, further comprising an oil filter coupled at least indirectly in between the second end of the first camshaft and the second channel, wherein the lubricant provided to the crankshaft is filtered.

13. A system comprising:
   a pump capable of supplying lubricant;
   a first passage at least partially linking the pump to a crankshaft bearing so that at least a first portion of the lubricant supplied by the pump is communicated to the crankshaft bearing; and
   a crankshaft supported with respect to the crankshaft bearing, wherein the crankshaft includes
      a first eccentric bearing, wherein the first eccentric bearing is configured to support at least one balance weight component;
      a second passage within the crankshaft, wherein the second passage is provided with at least a second portion of the lubricant by way of the crankshaft bearing and communicates at least a third portion of the lubricant to a first outer surface of the first eccentric bearing; and
      a second eccentric bearing, wherein the second eccentric bearing is configured to support the at least one balance weight component, and wherein the second passage within the crankshaft communicates at least a fourth portion of the lubricant to a second outer surface of the second eccentric bearing.

14. The system of claim 13,
wherein the second passage includes first and second oblique bores, a crankpin bore, and first and second additional bores coupling the first and second oblique bores to the first and second outer surfaces, respectively,
wherein the crankpin bore extends within an interior of a crankpin of the crankshaft, and wherein the first and second oblique bores couple the crankpin bore with first and second annular grooves formed within first and second crankshaft bearing portions at first and second ends of the crankshaft.

15. The system of claim 13, wherein the second passage communicates the at least third portion of the lubricant to a location on the outer surface of the eccentric bearing that is intermediate a first portion of the outer surface that is a maximum distance from a central axis of the crankshaft and a second portion of the outer surface that is a minimum distance from the central axis.

16. The system of claim 13, wherein the crankshaft further includes a crankpin bearing configured to interface a connecting rod, and wherein the second passage within the crankshaft also communicates at least a fourth portion of the lubricant to a second outer surface of the crank bearing.

17. The system of claim 13, wherein the second passage is formed at least in part by way of affixing a flange onto a main crankshaft portion, wherein one of the flange and the main crankshaft portion includes a groove so that, upon the affixing of the flange upon the main crankshaft portion, an internal channel is created.

18. A single-cylinder internal combustion engine comprising:
a cylinder;
a crankcase;
a first camshaft supported at least indirectly by the crankcase, wherein the first camshaft includes a first cam;
a second camshaft supported at least indirectly by the crankcase, wherein the second camshaft includes a second cam;
a crankshaft supported at least indirectly by the crankcase, wherein the crankshaft is at least indirectly coupled to each of the first and second camshafts so that rotation of the crankshaft causes rotation of each of the first and second camshafts and their respective cams, wherein rotation of the respective cams is capable of producing corresponding movement of first and second valves associated with the cylinder, respectively; and
means for communicating lubricant to at least one bearing associated with the crankshaft, wherein the means for communicating lubricant includes at least first and second channels wherein the first channel is formed internally within one of the first and second camshafts, and the second channel is at least partly molded within a removable top portion of the crankcase.

19. The single-cylinder engine of claim 18, wherein the at least one bearing of the crankshaft bearing includes an eccentric bearing intended to support at least one balance weight.

20. A method of communicating lubricant within an internal combustion engine, the method comprising:
communicating at least a first portion of the lubricant to a crankshaft bearina by way of at least one first channel;
further communicating at least a second portion of the lubricant from the crankshaft bearing through at least one second channel within the crankshaft to an eccentric bearing, wherein the eccentric bearing is configured for supporting at least a portion of a balance weight;
pumping the lubricant by way of a pump, and
wherein the first channel includes an internal passage through a camshaft.

\* \* \* \* \*

UNITED STATES PATENT AND TRADEMARK OFFICE
CERTIFICATE OF CORRECTION

PATENT NO. : 6,935,293 B2
DATED : August 30, 2005
INVENTOR(S) : Bonde et al.

It is certified that error appears in the above-identified patent and that said Letters Patent is hereby corrected as shown below:

Column 18,
Line 27, "bearina" should be -- bearing --.

Signed and Sealed this

Tenth Day of January, 2006

JON W. DUDAS
*Director of the United States Patent and Trademark Office*